United States Patent
Finkelstein et al.

(10) Patent No.: US 10,410,273 B1
(45) Date of Patent: Sep. 10, 2019

(54) ARTIFICIAL INTELLIGENCE BASED IDENTIFICATION OF ITEM ATTRIBUTES ASSOCIATED WITH NEGATIVE USER SENTIMENT

(71) Applicant: Amazon Technologies, Inc., Seattle, WA (US)

(72) Inventors: Adam James Finkelstein, Seattle, WA (US); David Akira Gingrich, Seattle, WA (US); David Michael Hurley, Seattle, WA (US); Stephen Brent Ivie, Bothell, WA (US); Siu Nam Wong, Seattle, WA (US); Siqi Zhao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1199 days.

(21) Appl. No.: 14/562,451

(22) Filed: Dec. 5, 2014

(51) Int. Cl.
G06N 5/04 (2006.01)
G06N 20/00 (2019.01)
G06Q 30/06 (2012.01)

(52) U.S. Cl.
CPC ......... *G06Q 30/0631* (2013.01); *G06N 5/048* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,090,621 | B1 | 1/2012 | Chakrabarti et al. |
| 8,380,583 | B1 | 2/2013 | Chanda |
| 9,270,778 | B1 | 2/2016 | Brown |
| 9,286,391 | B1 | 3/2016 | Dykstra et al. |
| 9,367,628 | B2 | 6/2016 | Fechete et al. |

(Continued)

OTHER PUBLICATIONS

Baptist Vandersmissen, "Automated detection of offensive language behavior on social networking sites," IEEE Transaction, 2012—lib.ugent.be (https://lib.ugent.be/fulltxt/RUG01/001/887/239/RUG01-001887239_2012_0001_AC.pdf) (Year: 2012).*

(Continued)

*Primary Examiner* — Kathleen Palavecino
*Assistant Examiner* — Lance Y Cai
(74) *Attorney, Agent, or Firm* — Knobbe Martens Olson & Bear LLP

(57) ABSTRACT

A recommendation system uses artificial intelligence to identify, based on negative sentiment cues from users, item attributes, such as keywords, that users may find offensive or undesirable. The negative sentiment cues may be explicit (e.g., a user selects an option not to view a particular recommendation again), implicit (e.g., a user does not interact with recommendations relating to an attribute), or both. The system may use a computer model generated based on these identified attributes to filter or modify recommendations to a user or group of users. For instance, if a particular keyword is identified as highly offensive to a group of users, items associated with the keyword may be filtered from item recommendations presented to the group of users. If an attribute is identified as moderately offensive to a user, items associated with the attribute may be down-weighted in item recommendations presented to the user.

12 Claims, 4 Drawing Sheets

(56) References Cited

U.S. PATENT DOCUMENTS

| | | |
|---|---|---|
| 9,720,963 B2 | 8/2017 | Barker et al. |
| 2009/0119157 A1 | 5/2009 | Dulepet |
| 2009/0222551 A1 | 9/2009 | Neely et al. |
| 2010/0145764 A1 | 6/2010 | Silva et al. |
| 2012/0047219 A1 | 2/2012 | Feng et al. |
| 2012/0290399 A1 | 11/2012 | England et al. |
| 2013/0304456 A1* | 11/2013 | Spears .............. G06F 17/30867 704/9 |
| 2014/0278786 A1 | 9/2014 | Liu-Qiu-Yan |
| 2015/0052238 A1 | 2/2015 | Ganesh |
| 2015/0161606 A1 | 6/2015 | Lee |
| 2015/0193539 A1 | 7/2015 | Fechete et al. |
| 2015/0206153 A1 | 7/2015 | Lee |
| 2015/0286728 A1 | 10/2015 | Kruglick |
| 2015/0309987 A1* | 10/2015 | Epstein ............... G06F 17/2765 704/9 |
| 2015/0370818 A1 | 12/2015 | Des Jardins et al. |
| 2016/0026920 A1 | 1/2016 | Sullivan et al. |
| 2016/0034853 A1 | 2/2016 | Wang et al. |
| 2016/0036980 A1 | 2/2016 | Ristock et al. |
| 2016/0125502 A1 | 5/2016 | Byron et al. |
| 2016/0253409 A1 | 9/2016 | Pappas |

OTHER PUBLICATIONS

Rendle et al., Factorizing Personalized Markov Chains for Next-Basket Recommendation, WWW 2010, pp. 811-820, Aug. 26-30, 2010.

\* cited by examiner

ARTIFICIAL INTELLIGENCE BASED IDENTIFICATION OF ITEM ATTRIBUTES ASSOCIATED WITH NEGATIVE USER SENTIMENT

CROSS-REFERENCE TO RELATED APPLICATIONS

The present application is related to U.S. patent application Ser. No. 14/562,567, filed on Dec. 5, 2014, entitled "ARTIFICIAL INTELLIGENCE BASED IDENTIFICATION OF NEGATIVE USER SENTIMENT IN EVENT CHAINS," the contents of which are substantially identical and hereby incorporated by reference herein.

BACKGROUND

Some web sites and other types of interactive systems implement recommendation services for generating personalized recommendations of items stored or represented in a data repository. One common application for recommendation services involves recommending products for purchase, rental, subscription, viewing or some other form of consumption. For example, some e-commerce web sites provide services for recommending products to users based on their respective purchase histories, rental histories, product viewing histories, or item ratings. Recommendation services are also used to recommend web sites, news articles, users, music and video files, and other types of items.

Recommending content to users has many benefits, but can also lead in some cases to negative user experience with the recommendation service, for example when the recommended content is offensive. Users frequently opt-out of receiving e-mail advertisements, complain, or quit using systems implementing the recommendation services altogether if they receive recommendations for content they deem offensive or obnoxious. What offends or annoys users is variable from user to user and also can vary for a particular user over time.

BRIEF DESCRIPTION OF THE DRAWINGS

Specific embodiments and inventive features will now be described with reference to the drawings, which are provided for purposes of illustration, and not limitation.

DETAILED DESCRIPTION

Figure 1:
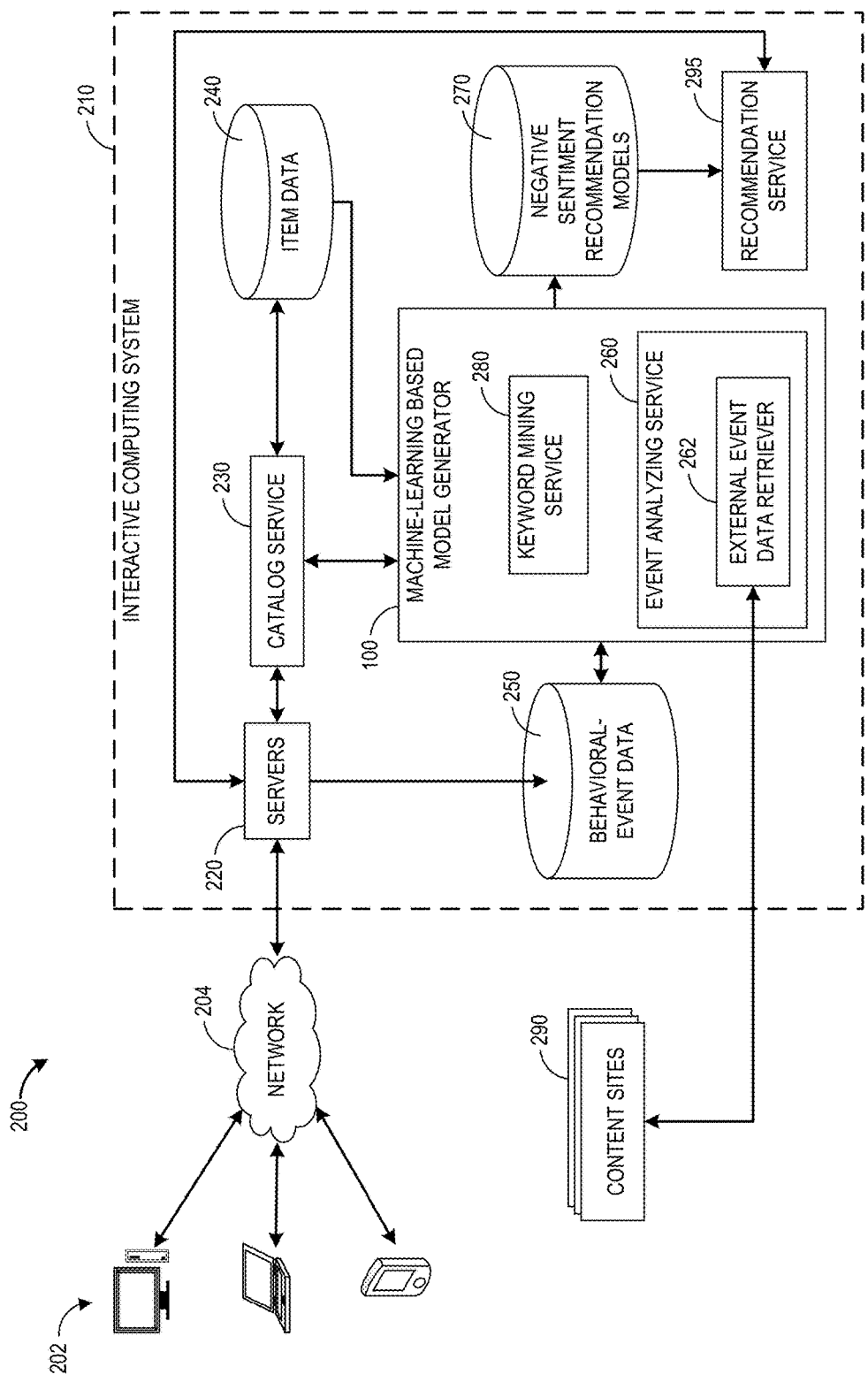
FIG. 1 is a pictorial diagram of an interactive computing system capable of using machine learning to identify item attributes associated with offensive item recommendations.

Some items, keywords, item attributes, or subjects may be inherently offensive, undesirable, or otherwise productive of negative sentiment among a group of users or for an individual user. In other scenarios, user perception of an item, keyword, item attribute, or subject (referred to collectively herein as "material" or "material for recommendation") can change over time, for example as external events influence the user's opinions of the item or subject, so that a user's sentiments about the item, keyword, or subject can change from positive or neutral to negative. Recommendations relating to such material that produces negative user sentiment may upset or offend a user, or otherwise interfere with the user having a positive experience with the recommendations system.

Previous recommendations systems use manually created lists of known offensive keywords to filter out item recommendations likely to be offensive. These are typically globally applicable, small heuristics that fail to detect many offensive or bad recommendations. Such manual lists have the disadvantages of becoming outdated as user perceptions change, of not including intentional misspellings or other workarounds designed to convey offensive keywords without detection, of relying solely on keywords to prevent offensive recommendations, and of being based on assumptions rather than analyzed user behavior. In addition, the use of such a list fails to take into account that different users or user segments are offended by different things. Further, such recommendations systems are unable to adapt when user sentiment regarding material for recommendation changes from positive or neutral to negative.

The above problems, among others, are addressed in some embodiments by the systems and associated processes described herein for identifying negative user sentiment and using the identified negative sentiment to modify presentation of material for recommendation. Using artificial intelligence or machine learning techniques, computer models can be built to detect-globally, at the user segment level, and on an individual user level-the recommendations that will offend users (or that are just terrible recommendations). These recommendations can then be filtered out of what is recommended to users.

Artificial intelligence can be used to collect negative sentiment cues, identify relationships between the negative sentiment cues and specific keywords or attributes, and generate a computer model specifying rules for using the keywords or attributes to modify recommendations presented to users. The computer models can be applied for filtering recommendations relating to specifically identified offensive items, keywords, or attributes as well as recommendations in similar situations. For example, the computer models can be used to predict whether recommendations relating to items similar to an item identified as being offensive to a user or group of users will be offensive, where similar items may have overall similarity and/or may share common keywords or attributes. Accordingly, negative user feedback can be received for an item or group of items and a computer model can be used to predict that a similar item will also elicit negative user sentiment. This can be beneficial for filtering recommendations for potentially offensive items that are new, unreviewed, or yet un-recommended and therefore not directly associated with any provided negative user sentiment. For example, the artificial intelligence system may detect that books by a particular author, or movies featuring a particular actor, are the subject of negative feedback. The model can be generated to then inhibit recommendations of other books by this author or other movies featuring this actor, even if very little user feedback has been collected so far for these other books and movies.

As another example, the computer models can be used to predict whether recommendations relating to an attribute identified as being offensive to one user will produce negative user sentiment for similar users, wherein behavioral data associated with the user and a similar user includes a threshold number of events or an identified key event in a chain of events. This can be beneficial for filtering recommendations for potentially offensive items for users who have not personally provided negative sentiment cues but who may nevertheless be offended in a similar manner to another user who has provided cues.

One example of a computer model can be a keyword-based model that uses machine learning to build a user-specific, user-segment-specific, or non-user specific model of the catalog item attributes (for example, keywords, etc.) associated with negative user sentiment in some embodiments. In other embodiments, a model can be a sequential model which detects sequences of events that lead to offending a user, for example using a Personalized Markov Chain, and extrapolates offensive attributes from the sequences. Some embodiments may train a model to predict what offends users. This could be done both globally and/or for user segments or individuals. For example, the model could be trained through standard machine learning, supervised learning, or through a technique like Personalized Markov Chains which enable identification of series of actions which lead to offending users.

Such models can be used to inhibit recommendations of items in an electronic catalog having these attributes, or to inhibit recommendations of other types of content outside of the electronic catalog context (for example, recommendations for news articles, content sites, services, subscriptions, and the like). Either in an offline build, or live when recommendations are about to be shown, the modified recommendation techniques described herein can use the models to identify the items which are likely to offend an individual user or group of users. If an item is above a certain likelihood of offending a user, it can be filtered out of recommendations for presentation. Alternatively, if items with the best numerical scores are recommended to a user in the recommendations system, the scores can be down-weighted for items with greater than a threshold likelihood to offend.

These systems and processes can collect data representing a behavioral history of a user (or group of users) and determine, based on the data, whether the user or users provided negative sentiment cues. This data may include user interactions with an electronic catalog of items, for example item viewing events, item purchase events, item recommendation interactions, and the like, as well as user behaviors from external content sites, for example postings in forums, on social media, and the like. In some embodiments, the data can be analyzed to identify keywords (including keyword phrases) that are offensive, undesired, or otherwise productive of negative sentiment for an individual user, subgroup of users, or an entire population of users. In some embodiments, the data can be analyzed to identify event sequences indicating negative sentiment of an individual user, subgroup of users, or an entire population of users, the negative sentiment relating to a particular subject or item.

In a first embodiment of a machine learning technique for identifying negative user sentiment and building models (referred to herein as the "keyword identification embodiment"), negative sentiment cues provided by users can be analyzed to identify offensive keywords. The identified offensive keywords can be used in one example to generate a "blacklist" of keywords that should never appear in a recommendation or in a catalog description of a recommended item. Items associated with the blacklisted keywords may also be excluded from recommendations. The keywords can be words, phrases, attributes (for example, item title, brand, author, subject, actors, description, category, price, etc.), and the like. Identified offensive keywords can be used in another example to generate a computer model for intelligently filtering recommendations relating to the keywords for presentation to a specific user or group of users.

For example, data representing a behavioral history of a user can be analyzed to identify keywords that are offensive, undesirable, or otherwise productive of negative sentiment from a user or group of users about material for recommendation. For example, behavioral data can include negative sentiment cues indicating what offends users, and the keyword identification embodiment can identify negative sentiment cues from user behavioral data. To name a few examples, the behavioral data can be analyzed to locate e-mail recommendations where a user responded by opting out of the recommended material or feature, gather recommendations that caused users to contact customer service to explicitly complain, mine social media to find negative sentiment analysis posts where users derided recommendations they had received, detect recommendations which, subsequent to being shown the user, the user used the site again (or stopped using the site for a determined timeframe) or never looked at a recommendation feature again (or for a determined timeframe), detect that a user operates their device in ways that usually denote anger/sadness after viewing recommendation, etc. As additional examples, the negative sentiment cues may be feedback events that occur within a predetermined timeframe following a recommendation or recommendations in some embodiments, for example including low or "not interested" ratings of an item, discontinued browsing for an extended time, or submission of explicit negative feedback such as a "thumbs down" vote on a presented recommendation. Negative sentiment cues can be other events in user behavioral data in some embodiments, for example user views of certain types of items associated with negative sentiment (e.g., grief, coping, self-help, or traumatic event related books or other items), a user deleting an item view from the user's item viewing history, user comments regarding an item or attribute on social media or forum postings, or user calls to customer service regarding an item or attribute.

Explicit negative sentiment cues can be cues in which a user explicitly addresses their feelings or sentiments about material for recommendation, for example feedback on recommendations and discussion of feelings about the material for recommendation. Implicit negative sentiment cues can be cues in which a user implicitly conveys their feelings or sentiments about the material for recommendation, for example deleting an item view from the user's item viewing history, non-interaction with recommendations relating to the material, and views of items associated with negative sentiment.

The keyword identification embodiment can determine a plurality of keywords associated with the material for recommendation. In some embodiments, such keywords may be stored in association with an item in an item data repository and retrieved during user sentiment analysis. In some embodiments, keyword extraction may be performed by known techniques on text contained in item titles, item catalog descriptions, item attributes, item hierarchy data (e.g., categorization of items according to a hierarchy or other structure of categories), recommendation content, user comments or postings, and other behavioral data from which the negative sentiment cues were gleaned. Keywords can be words, phrases, metadata, item attributes, item categories, and the like. Keywords can, in some embodiments, be features extracted from images (e.g., item images in an electronic catalog) using feature identification techniques. For example, certain gestures, graphics, symbols, body features, or other image-based features can be identified that may be offensive to a user or group of users.

The keyword identification embodiment can then determine, based at least partly on the negative sentiment cues, a keyword or keywords of the plurality of keywords associated with the material for recommendation that is offensive to the plurality of users. In some embodiments, if the negative sentiment cues are not already associated with a particular item, the behavioral data can be analyzed to determine an item or items associated with the negative sentiment cues and/or identified offensive keywords. For example, an item recommended to a user just before the user submits upset comments via electronic catalog reviews or other content sites, calls customer service to complain about recommendations, or stops browsing an electronic catalog implementing the recommendations system for an extended period of time may be associated with the negative sentiment cues. In another example, an item associated with an identified offensive keyword can be associated with the negative sentiment cue.

In some embodiments, such behavioral data analysis may occur at the user level to identify items that, if recommended, would offend a particular user and to customize future recommendations presented to that user. To find what offends specific individuals, the machine learning techniques for identifying negative sentiment can gather specific information on them, for example through social media posts, behavioral history on retail websites, user profiles, what the user has been offended by in the past, and the like. For example, personalized Markov chains can be used to detect whether a user is likely to be offended if they are recommended an item in the same category of as an item that they recently purchased (e.g., recommending more TVs after a user buys a TV). As another example, the machine learning techniques can more accurately predict attributes of items that can be offensive, but sometimes are not. For instance, a user sensitive about their weight might be offended by being recommended weight loss items. Another user currently searching for weight loss items might find such a recommendation helpful. A user who has bought weight loss items and subsequently bragged on social media about how much weight they've lost might be offended if they keep getting recommended more weight loss items. The machine learning techniques can distinguish between these types of users based on negative sentiment analysis in order to present personalized recommendations to the users. As used herein, "offend," "offensive," and other forms of the word refer not only to offensive material but also to material that is disinteresting, annoying, unpleasant, or otherwise causing a negative reaction in a user.

In some embodiments, such behavioral data analysis may occur at the user segment level or global user population level to identify items that, if recommended, would offend segments of users and to customize future recommendations presented to users associated with such segments. Users may be grouped, clustered, or segmented into such segments based, for example, on purchase histories, shipping addresses, submitted feedback, or other characteristics. Identified offensive keywords and associated items, attributes, users, and/or user segments can be stored in an association map. An association map is one example of a negative sentiment recommendation model. A model built using identified offensive keywords can also be stored as a list, matrix, or other form of data suitable for associating the identified offensive keywords with items, item attributes, users, and the like. Some embodiments can build models of determined words which are deemed offensive by significant numbers of users in order to prevent recommending any items associated with these words.

The negative sentiment recommendation models can be used in real time to filter out, from recommendation sets, items likely to produce a negative reaction in an associated user or user segment. In other embodiments, rather than filtering out recommended items associated with user offense, the rankings of such recommended items can be lowered, reducing the likelihood that these items will be seen. In one example, a probabilistic algorithm can alternatively be used, in which case the probability of such recommended items being presented to a user would be reduced. Other uses for the identified keywords include provision to customer service representatives for guiding interaction with users and filtering or ordering search results or other information presentation outside of the recommendations context.

A second embodiment of a machine learning technique for identifying negative user sentiment identification and building models (referred to herein as the "event analysis embodiment") can identify items or other content that, when recommended to users, tend to produce negative sentiment or reactions (on a user-specific basis, group basis, or a global user population basis). The event analysis embodiment can gather data on the attributes of items including pictures, description, title, frequently associated user sentiment, social media words and/or sentiment referencing the item, item browse nodes or related subjects, and the like. The event analysis embodiment can analyze these items to look for distinguishing or characterizing attributes (for example keywords, author, manufacturer, price, etc.) or sets of item attributes. As used here, distinguishing or characterizing indicates these attributes or sets of attributes are not very common among items in the catalog and are therefore unique or somewhat unique to the analyzed items. The event analysis embodiment can build a model using these attributes for use in excluding or inhibiting recommendations of items having these attributes.

To illustrate, consider the following example. Top celebrity singers A and B are in a relationship and their songs are frequently purchased by the same segment of users of an electronic catalog. Then singer A is involved in a scandal, resulting in singer B terminating the relationship. There is a segment of users who are offended if they get a recommendation linking the two (i.e. because you like singer B you might like singer A), a segment of users who are offended if you recommend anything by singer A, and a segment of users who still like both. By analyzing this chain of events, the event analysis embodiment can determine that user sentiment relating to the scandal correlates with user sentiment regarding recommendations relating to singer A.

According to the event analysis embodiment, user sentiment analysis may begin by collecting negative sentiment cues or identifying negative sentiment cues from stored behavioral data. In the present example, the negative sentiment cues can relate to the subject of the scandal, to items associated with singer A, or directly to singer A. Negative sentiment cues can include, in some embodiments, text mining in user complaints, calls to customer service, email opt outs, explicit "do not recommend" feedback, item ratings and/or textual reviews, lower engagement with recommendations (e.g., engagement outside of expected bounds), and sentiment expressed on social media sites. Returning to the illustrative example, after the scandal there may be a dramatic drop in sales of singer A's music, many email opt-outs when singer A is advertised because of interest expressed in singer B, and people who bought merchandise or albums from singer B expressing negative sentiment on social media sites.

After collecting or identifying negative sentiment cues, the event analysis embodiment can cluster the negative sentiment cues, for example by user segments and/or item categorization. This can be done via a variety of techniques including LDA, K-means, K-Nearest neighbor, Bayesian statistics, classifiers, and the like. Accordingly, the event analysis embodiment can correlate segments of users with negative sentiment cues and can create an association map that stores data representing user segments and/or user segment attributes that are correlated with the negative sentiment cues. Some embodiments of the association map may further include weights representing the strength of the correlation with the negative sentiment.

Returning to the illustrative example, user segment A includes users in certain areas of the country where the scandal has been in the news, and user segment A have a much higher likelihood of expressing negative sentiment than users in other areas of the country where the scandal news is not as prominent (for example, user segment A users may be 1.5 times more likely to express negative sentiment than the average user). Users who have previously purchased items relating to singer B (user segment B) are also detected, based on the clustering and correlation, to have a much higher likelihood than the average user of expressing negative sentiment (for example, user segment B users may be 20 times more likely to express negative sentiment than the average user).

Based on the results of the event analysis embodiment, recommendation modification techniques can use the data stored in the association maps to filter, modify, or down weight recommendations associated with singer A for individual users that have expressed negative sentiment relating to the subject of singer A, and also for users in similar user segments as the individual users, wherein the similar user segments are associated with a higher likelihood of expressing negative sentiment relating to singer A.

Returning to the illustrative example, since many people in a specific area expressed dis-interest via negative sentiment cues in songs and merchandise associated with singer A, recommendations for singer A can be down weighted for all users who live in that area. If the user both lives in that area and have bought items from singer B in the past, both negative scores from the association map can be combined to provide an even stronger signal of negative sentiment associated with the user.

The material for recommendation determined to produce negative sentiment among users, by either the keyword identification embodiment or event analysis embodiment, can be used for filtering or modifying recommendations relating to the identified keywords, attributes, or items for the relevant user or user group. For example, in some embodiments the negative sentiment can be analyzed to determine a degree of negativity explicitly or implicitly expressed by the user or user group. A high degree of negative sentiment can be used to completely filter recommendations relating to an associated material for recommendation in some examples. A moderate or low degree of negative sentiment can be used, in some examples, to down weight recommendations relating to the associated material for recommendation, for example by reducing the likelihood that the recommendation will be presented to the user or placing the recommendation later in a list of recommendations. A moderate or minimal degree of negative sentiment can be used, in some examples, to modify the manner in which a recommendation relating to the associated material for recommendation is presented to a user. High, moderate, or minimal degrees of negative sentiment may be determined from the type of negative sentiment cue provided by the user (for example, explicit cue=high degree of negative sentiment, implicit cue=moderate or low degree of negative sentiment), explicit statements by the user regarding the material for recommendation (for example, user statements involving strong negative language such as "I hate/can't stand/loathe subject A" in an item review or external content site posting)=high degree of negative sentiment, user statement using less strong negative language such as "Subject A is distasteful"=moderate or low degree of negative sentiment), the nature of the material for recommendation (for example, inherently offensive=high degree of negative sentiment, subjectively offensive=moderate or low degree of negative sentiment), or a combination thereof. High, moderate, or minimal degrees of negative sentiment may be determined from the weight associated with the correlation of negative sentiment and a user or user segment in some embodiments, where high, moderate, and minimal correspond to particular ranges, percentiles, or relative likelihoods of weighted negative sentiment correlation.

To provide another illustrative example, if the negative user sentiment identification techniques identify that a user is highly offended by Quarterback X leaving the user's preferred football team to play for a rival team, then the recommendation modification techniques may filter out recommendations for all items relating to Quarterback X, for example sports memorabilia and autobiographies of Quarterback X. If the negative user sentiment identification techniques identify that a user is moderately offended by Quarterback X leaving the user's preferred football team to play for the rival team, then the recommendation modification techniques may down weight recommendations for some or all items relating to Quarterback X, for example presenting items relating to the team's new quarterback, Quarterback Y, before items relating to Quarterback X. If the negative user sentiment identification techniques identify that a user is minimally offended by Quarterback X leaving the user's preferred football team to play for the rival team, then the recommendation modification techniques may modify the presentation of recommendations relating to Quarterback X, for example by presenting a recommendation explanation of "because you previously purchased items relating to Quarterback X" instead of "because your item history indicates that you are a fan of Team A."

Although discussed primarily in the context of enhancing user experience with recommendations, other uses for the identified material that produces negative user sentiment include provision to customer service representatives for guiding interaction with users and filtering or ordering search results or other information presentation outside of the recommendations context. Further, although discussed primarily in the context of negative user sentiment, such techniques can be adapter to identify positive user sentiment for increasing a likelihood of being presented with a particular recommendation in some embodiments. Various embodiments will now be described with respect to the figures that are intended to illustrate, and not to limit, the user sentiment analysis and usage techniques described herein.

Example System

FIG. 1 illustrates one embodiment of an operating environment 200 including an interactive system 210 for providing users with access to an interactive computing system for viewing recommendations provided based on models generated through the machine-learning techniques described herein. The system 210 can include one or more servers 220 that provide network-based user access to an electronic catalog of items that are available for purchase, rental, download, and/or other transaction types. The server 220 may include multiple distinct server machines, such as web server machines. For purposes of illustration, it will be assumed that the system 210 hosts a network site that provides functionality for enabling users to acquire items represented in the catalog, although this need not be the case. The interactive system 210 may be accessed over a network 204 by users via one or more types of user computing devices 202, such as a laptop or tablet computer, personal computer, personal digital assistant (PDA), hybrid PDA/mobile phone, mobile phone, smartphone, global positioning system (GPS) device, electronic book reader, set top box, camera, audiobook player, digital media player, video game console, in-store kiosk, television, appliance, electronic device for inclusion in vehicles or machinery, gaming device, or the like. The network 204 may be any wired network, wireless network, or combination thereof (e.g., the Internet, a mobile communications network, and the like).

As is conventional, the electronic catalog may include, for each item available for acquisition from the interactive computing system 210, data used to generate a network page that describes the item (also referred to as an item detail page) for each item, and data used to generate a hierarchical browse tree for browsing the items by item category. Information about the various items (item images, descriptions, prices, associated keywords, associated attributes, etc.) may be stored in an item data store 240 or other data repository. The server 220 may retrieve item data from the data store 240 via a catalog service 230 and populate network pages (e.g., web pages) with such item data. The component for dynamically generating network pages including modified recommendations, including pages for presenting negative sentiment recommendation models of the type shown in FIG. 1, is represented by the recommendation service 295.

As used herein, the term "item," in addition to having its ordinary meaning, is used interchangeably to refer to an item itself (e.g., a particular product) and to its description or representation in a computer system or electronic catalog. As will be apparent from the context in which it is used, the term may also sometimes be used herein to refer only to the item itself or only to its representation in a computer system.

The item data repository 240, behavioral-event data repository 250, and negative sentiment recommendation models repository 270 may be embodied in hard disk drives, solid state memories, any other type of non-transitory computer-readable storage medium, and/or a file, a database, a relational database, stored in any such non-transitory computer-readable medium accessible to the catalog service 230. The item data repository 240, behavioral-event data repository 250, and negative sentiment recommendation models repository 270 may also be distributed or partitioned across multiple local and/or remote storage devices without departing from the spirit and scope of the present disclosure. For example, item data may be stored in different storage devices and/or accessed via different services. In some embodiments, the item data repository 240, behavioral-event data repository 250, and negative sentiment recommendation models repository 270 may be implemented as a data storage web service.

As users browse the electronic catalog and perform various types of actions (such as viewing and purchasing items), the system 210 may record one or more types of sentiment-related events in behavioral event data repository 250. This data repository 250 may, in some implementations, include multiple distinct log files and/or databases. In some embodiments, the data repository 250 may be embodied in various types of computer-readable storage similar to the item data store 240. The recorded events may include, for example, interactions with recommended items, item purchase events, item selection events, item viewing events (which may be based on visits to item detail pages), "shopping cart add" events, "wish list add" events, item review events, customer service interactions, and/or any other type of user action that evidences user sentiment. In some embodiments, the external event data retriever 262 can retrieve data representing sentiment-related from external content sites 290 for inclusion in the behavioral event data repository 250. External content sites 290 can be social media sites, forums, news sites, and the like, and the retrieved data can include user comments, postings, and news stories relating to user sentiment.

The recorded events or event histories stored in the behavioral event data repository 250 may be analyzed periodically by the keyword mining service 280 and/or event analyzing service 260 of the machine-learning based model generator 100 to generate models of negative user sentiment, for example association mappings between one or more of individual users, user segments, negative sentiments, negative sentiment weightings, and material for recommendation (attributes, keywords, and/or items). The keyword mining service 280 can implement the keyword identification embodiments described herein for identifying keywords that have caused, or are likely to cause, negative sentiment in a user or user segment. The keyword mining service 280 can retrieve behavioral data from the behavioral event data repository 250 and implement the keyword identification embodiments described herein for identifying keywords that have or are likely to cause negative sentiment in a user or user segment and generating association mappings. The event analyzing service 260 can retrieve behavioral data from the behavioral event data repository 250 and implement the event analysis embodiments described herein for identifying, from related events, subjects that have or are likely to cause negative sentiment in a user or user segment.

Models generated by the machine-learning based model generator 100 can be stored in the negative sentiment recommendation models repository 270. The association mappings can be stored in an aggregate manner (e.g., aggregate of all users or user segments correlated with negative sentiment for particular recommended material) as well as in distinct log files and/or databases associated with each user such that each user's negative sentiments are stored in association with the user. In some embodiments, an association mapping can be populated by both the event analyzing service 260 and the keyword mining service 280. In some embodiments, separate association mappings may be maintained for maps generated by the event analyzing service 260 and the keyword mining service 280.

Example Negative Sentiment Recommendation Models

Included below is an example data association illustrating one embodiment of a negative sentiment recommendation model. The example data association may be in the form of a table or matrix containing entries for keyword(s), item(s), attribute(s), user(s), and a reason for correlation of the keyword(s), item(s), attribute(s) and user(s). Examples of entries included in the table or matrix are described below. The reasons are provided to illustrate possible correlations and may not be stored with the data association in some embodiments. In addition, some embodiments may not store specific items in association with identified offensive keywords and attributes, for example due to a changing electronic catalog, and may instead apply the computer model in real time to identify potentially offensive items based on the keywords and/or attributes. In some embodiments, additional weighting information can be stored in association with a user or user segment to indicate a level of correlation between the user and negative sentiment or a strength of the negative sentiment.

As an example, a keyword of Quarterback X and items of sports memorabilia for Quarterback X can be associated with user segment A including fans of Pro Football Team A for the following reason: (a) user's item history indicates that user is a fan of Pro Football Team A, (b) Quarterback X left Pro Football Team A to play for its rival, and (c) fans of Pro Football Team A have expressed offense to Quarterback X's team change. In some embodiments, this correlation can be determined by the event analysis embodiment, for example by analyzing user sentiment cues such as social media postings and news articles relating to Quarterback X's team change. In some embodiments, this correlation can be determined by the keyword identification embodiment, for example by mining negative sentiment cues to determine that the keyword of Quarterback X is offensive to users in user segment A.

As another example, an item of Romance Novel can be associated with a user A because the user deleted a view of Romance Novel from the user's item viewing history. In some embodiments, this correlation can be determined by the event analysis embodiment.

As another example, the keywords of wedding, marriage, and engagement and the attribute of "category=weddings" may be associated with users A, B, and a number of other individual users N for the following reason: Because (a) user previously created a wedding registry, (b) subsequently deleted user's registry, and (c) viewed books relating to ending an engagement/having an engagement ended. In some embodiments, this correlation can be determined by the event analysis embodiment, for example by analyzing the chain of events beginning with the registry creation and ending with the user viewing negative sentiment-related items (e.g., the books relating to ended engagements). In some embodiments, this correlation can be determined by the keyword identification embodiment, for example by mining negative sentiment cues to determine that the keywords of wedding, marriage, and engagement are offensive to users who have viewed the negative sentiment-related items relating to ended engagements.

As another example, the keywords of diet, dieting, and weight loss, items of dieting books and scales, and the attribute of "subject=dieting" may be associated with negative sentiment in users A, C, and a number of other individual users N for either of the following reasons: (a) the user provided negative feedback on recommendations relating to dieting books or (b) the user submitted negative comments relating to dieting. In some embodiments, this correlation can be determined by the event analysis embodiment, for example by analyzing the user comments to associate negative sentiment with the subject of dieting. In some embodiments, this correlation can be determined by the keyword identification embodiment, for example by mining negative sentiment cues to determine that the keywords of diet, dieting, and weight loss are offensive to users who have provided negative feedback on recommendations relating to dieting books. The item of dieting books can be extrapolated from association with one or more of the keywords.

As another example, the keyword and attribute of "subject=Pop Artist A" may be associated with negative sentiment in user segments B and C, as well as in user D and a number of other individual users N for the following reasons: (a) user is a fan of Pop Artist B, (b) Pop Artist B ended a romantic relationship with Pop Artist A due to a scandal involving Pop Artist A, and either (c) user has expressed negative sentiment regarding the scandal, (d) user lives in a region where the scandal or a similar scandal has received recent negative press, or (e) user provided negative feedback on recommendation(s) relating to Pop Artist A after the date of the scandal. In some embodiments, such correlations can be determined by the event analysis embodiment, for example by analyzing the chain of events relating to the two pop artists and determining negative user sentiment, as described above. In some embodiments, this correlation can be determined by the keyword identification embodiment, for example by mining negative sentiment cues to determine that the keyword of Pop Artist A is offensive to a user who has expressed negative sentiment regarding the scandal, lives in a region where the scandal or a similar scandal has received recent negative press, or provided negative feedback on recommendation(s) relating to Pop Artist A after the date of the scandal.

As another example, the keywords of Current Event and Political Figure A and attributes of "subject=Current Event; subject=Political Figure A" may be associated with negative sentiment in a global user population for the following reason: Current Event and associated Political Figure A have received global negative press relating to crimes against humanity. In some embodiments, such correlation can be determined by the event analysis embodiment, for example by analyzing the news events, user comments, and other media relating to the current event and political figure. In some embodiments, this correlation can be determined by the keyword identification embodiment, for example by mining negative sentiment cues to determine that the keywords of Current Event and Political Figure A are globally offensive to the entire population of users of the recommendation system.

The above-described examples are provided for purposes of explaining one embodiment of an association map and the techniques that can be used to create the association map, and not to limit the association map to the specific factors described. Other data associations, material for recommendation, reasons, and analysis can be used in other embodiments. In some embodiments, such the models (or a relevant portion thereof) can be exposed to users, for example with a selectable option to modify or provide feedback on the identified negative sentiments and associated items, attributes, and keywords determined for a user.

Example Negative Sentiment Identification Techniques

Figure 2:
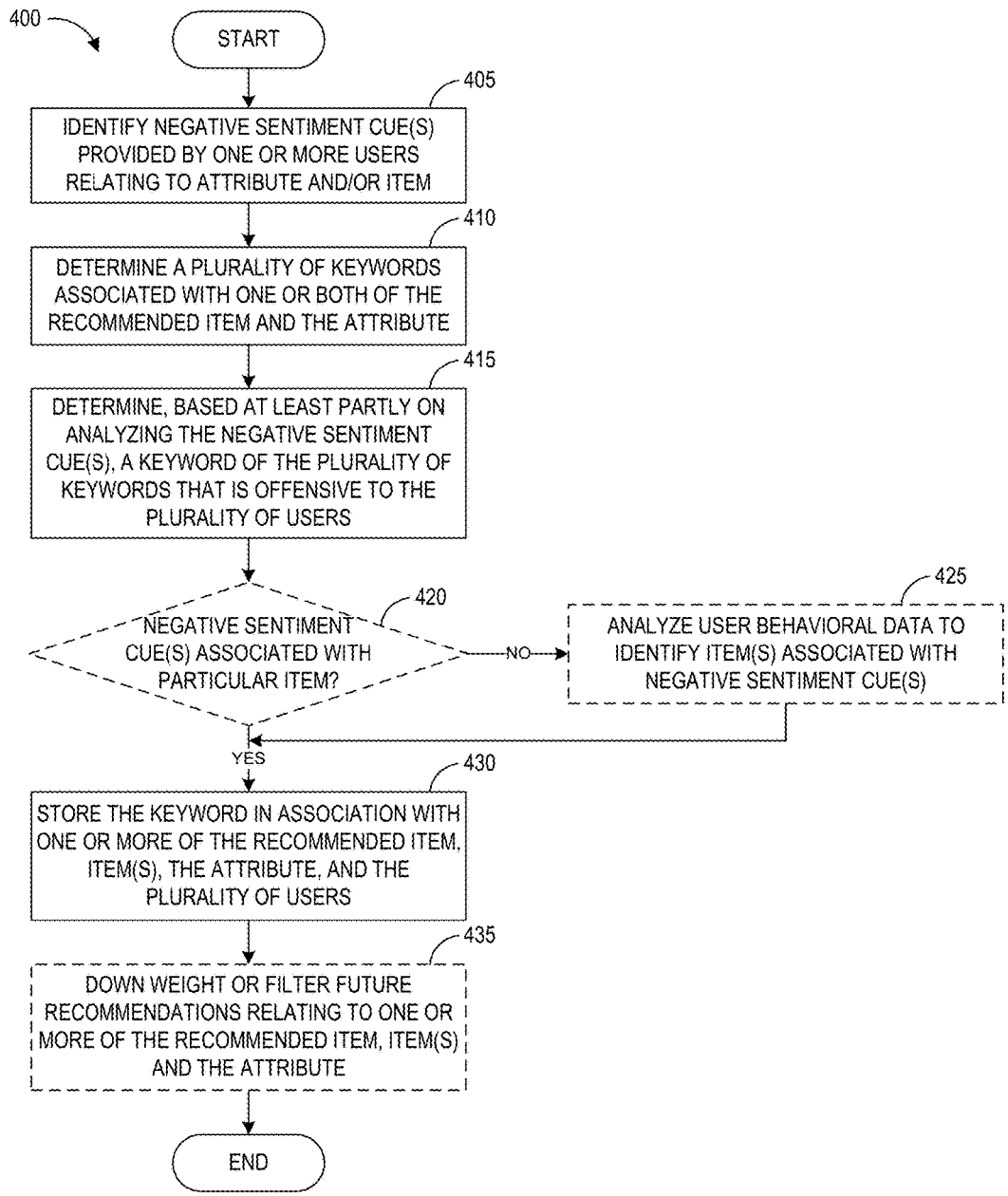
FIG. 2 is a flow diagram depicting an illustrative embodiment of a process that may be implemented by an interactive system, such as the system of FIG. 1, to identify keywords associated with negative user sentiment.

FIG. 2 is a flow diagram depicting an illustrative embodiment of an artificial intelligence process 400 that may be implemented by an interactive system, such as the system of FIG. 1, to identify keywords associated with negative user sentiment. For purposes of illustration, the process 400 is discussed as being implemented by the keyword mining service 280, though in other embodiments the process 400 can be implemented by any module, service, or system equipped to perform the keyword identification embodiment of user sentiment analysis. The illustrated ordering of the blocks of process 400 is for purposes of example, and in other implementations the steps can be performed in a different order or at the same time, as discussed in more detail with reference to specific blocks.

At block 405, the keyword mining service 280 can identify a negative sentiment cue or set of cues provided by a user or segment of users about an attribute and/or item. As used herein, an attribute can be an item attribute, item categorization, or subject. For example, the keyword identification embodiment can identify negative sentiment events by analyzing stored user behavioral data. As described above, negative sentiment cues can include feedback events that occur within a predetermined timeframe following a recommendation or recommendations in some embodiments, for example including low or "not interested" ratings of an item, discontinued browsing for an extended time, or submission of explicit negative feedback such as a "thumbs down" vote on a presented recommendation. Negative sentiment events can additionally or alternatively include user views of certain types of items associated with negative sentiment (e.g., grief, coping, self-help, or traumatic event related books or other items), a user deleting an item view from the user's item viewing history, user comments regarding an item or attribute on social media or forum postings, or user calls to customer service regarding an item or attribute.

Though not illustrated, in some embodiments the keyword mining service 280 can additionally identify positive sentiment cues. Positive sentiment cues can be used, for example, to determine whether user sentiment about an item or attribute is changing from negative to positive. To illustrate, a celebrity may offend the public for a while and then slowly regain good standing in the public eye, and accordingly users may transition from providing negative sentiment cues about the celebrity and related merchandise to providing positive sentiment cues. Positive sentiment cues can be used in another example to reduce a weight of negative sentiment cues in a computer model for filtering recommendations. In some implementations, a computer model may apply a weighting scheme to identified negative and/or positive sentiment cues such that more recently provided cues have a relatively higher weight than less recently provided cues in determining how recommendations are filtered.

In some embodiments, the keyword mining service 280 can separate the negative sentiment cues into explicit and implicit cues, for example for use in determining weights of negative user sentiment. Explicit negative sentiment cues can be cues in which a user explicitly addresses their feelings or sentiments about material for recommendation, for example feedback on recommendations and discussion of feelings about the material for recommendation. Implicit negative sentiment cues can be cues in which a user implicitly conveys their feelings or sentiments about the material for recommendation, for example deleting an item view from the user's item viewing history, non-interaction with recommendations relating to the material, and views of items associated with negative sentiment.

At block 410, the keyword mining service 280 can determine a plurality of keywords associated with the material for recommendation. In some embodiments, such keywords may be stored in association with an item in an item data repository and retrieved during user sentiment analysis. In some embodiments, keyword extraction may be performed by known techniques on text contained in item titles, item catalog descriptions, item hierarchy data, recommendation content, user comments or postings, and images, to name a few examples. Keywords can include words, phrases, metadata, item attributes, item categories and features extracted from images. In some implementations block 410 may be performed before or at the same time as block 405.

At block 415, the keyword mining service 280 can determine, based at least partly on analyzing the negative sentiment cues, a keyword or keywords of the plurality of keywords associated with the material for recommendation that is offensive to the plurality of users. For example, keywords associated with the negative sentiment cues can be extracted and correlated with the keywords associated with the attribute or item.

Optionally, at decision block 420, the keyword mining service 280 can determine whether the negative sentiment cues are associated with a particular item. If the negative sentiment cues are not already associated with a particular item, the process 400 transitions to optional block 425 and keyword mining service 280 can analyze behavioral to determine an item or items associated with the negative sentiment cues and/or identified offensive keywords. For example, an item recommended to a user just before the user submits upset comments via electronic catalog reviews or other content sites, calls customer service to complain about recommendations, or stops browsing an electronic catalog implementing the recommendations system for an extended period of time may be associated with the negative sentiment cues. In some embodiments, recommendations techniques based on keywords may not require identification of specific items and blocks 420 and 425 can be omitted. In some embodiments, blocks 405 through 415 and 430 can be performed offline by keyword mining service 280 to generate a computer model specifying rules for filtering recommendations, and blocks 420 and 425 can be performed in real time by recommendations service 295 by implementing the rules in the computer model to identify specific items for filtering from recommendations. As used herein, "real time" refers to something that is done during a time frame in which a user is being presented with recommendations, for example in the time between when a user requests a page and the time when the page, together with any recommendations, is presented to the user. Accordingly, "real time" means substantially as instantaneously as possible, limited by the ability of the keyword mining service 280 and/or recommendations service 295 to receive the user request, generate a listing of non-offensive recommendations, and transmit data for presentation of the recommendations to the user device.

If blocks 420 and 425 are omitted, or if, at block 420, the keyword mining service 280 determines that the negative sentiment cues are associated with a particular item, then the process 400 transitions to block 430 to store the keyword in an association map with one or more of the recommended item, item(s), the attribute, and the plurality of users. In one example, keywords and other attributes can be stored as a computer model specifying rules for filtering recommendations. In another example, the keywords and any associated items, attributes, and/or users can be stored as an association map. The computer model and/or association map can also include weights determined by the keyword mining service to reflect a determined level of user offense to a keyword. In some embodiments, the process 400 may terminate after storage of the association map.

In some embodiments, the behavioral analysis of the process 400 may occur at the user segment level or global user population level to identify keywords and/or items that, if recommended, would offend segments of users and to customize future recommendations presented to users associated with such segments. For example, keywords may be recommended as search terms for refining or augmenting a search. Users may be grouped, clustered, or segmented into such segments based, for example, on purchase histories, shipping addresses, submitted feedback, or other characteristics.

In some embodiments, the process 400 may continue to block 435 at which the recommendation service 295 can down weight, filter, or modify the presentation of recommendations relating to one or more of the recommended item, item(s) and the attribute for associated users or user subgroups. In such embodiments, blocks 405 through 430 of the process may be performed periodically or "offline" by the keyword mining service 280 while block 435 is performed in real time by the recommendation service 295.

Figure 3:
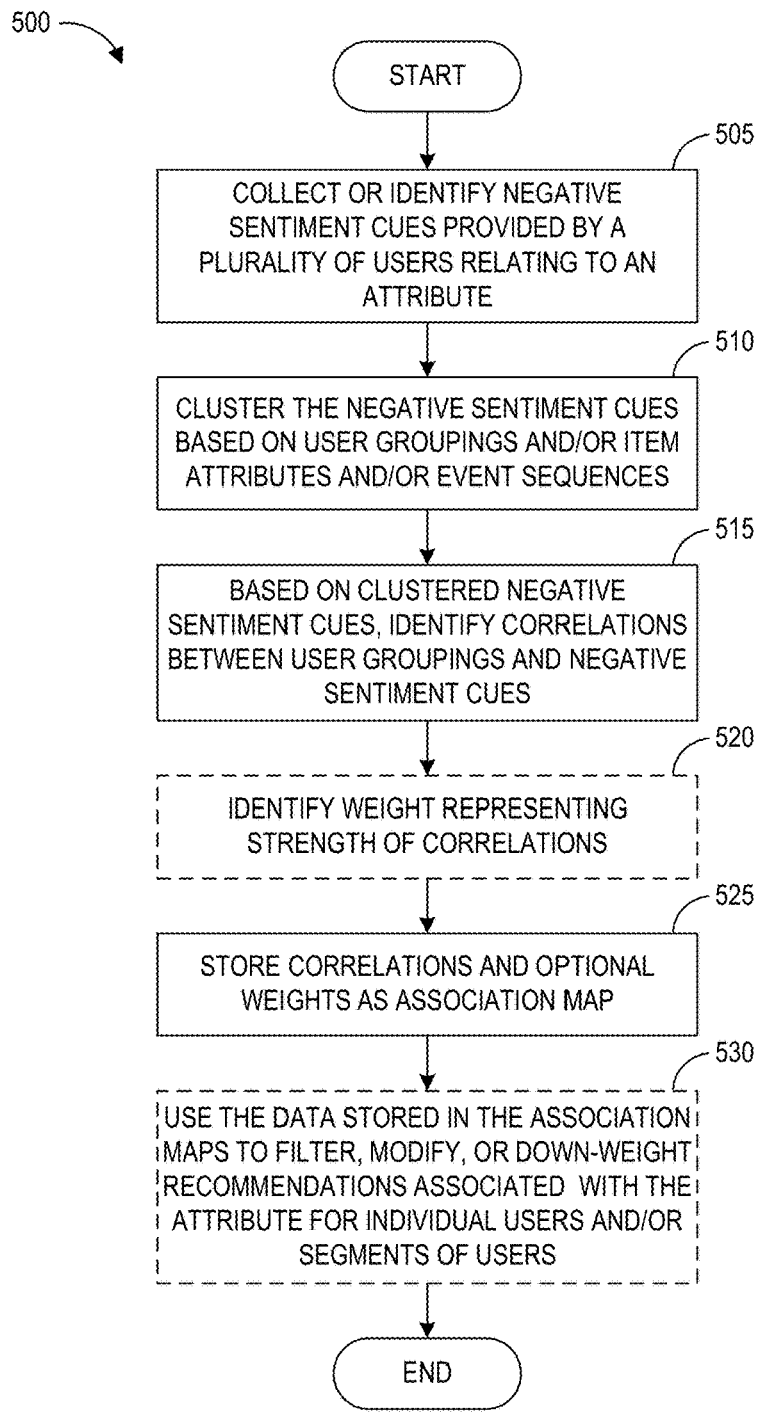
FIG. 3 is a flow diagram depicting an illustrative embodiment of a process that may be implemented by an interactive system, such as the system of FIG. 1, to identify items or subjects associated with negative user sentiment based at least partly on an event analysis.
Figure 4:
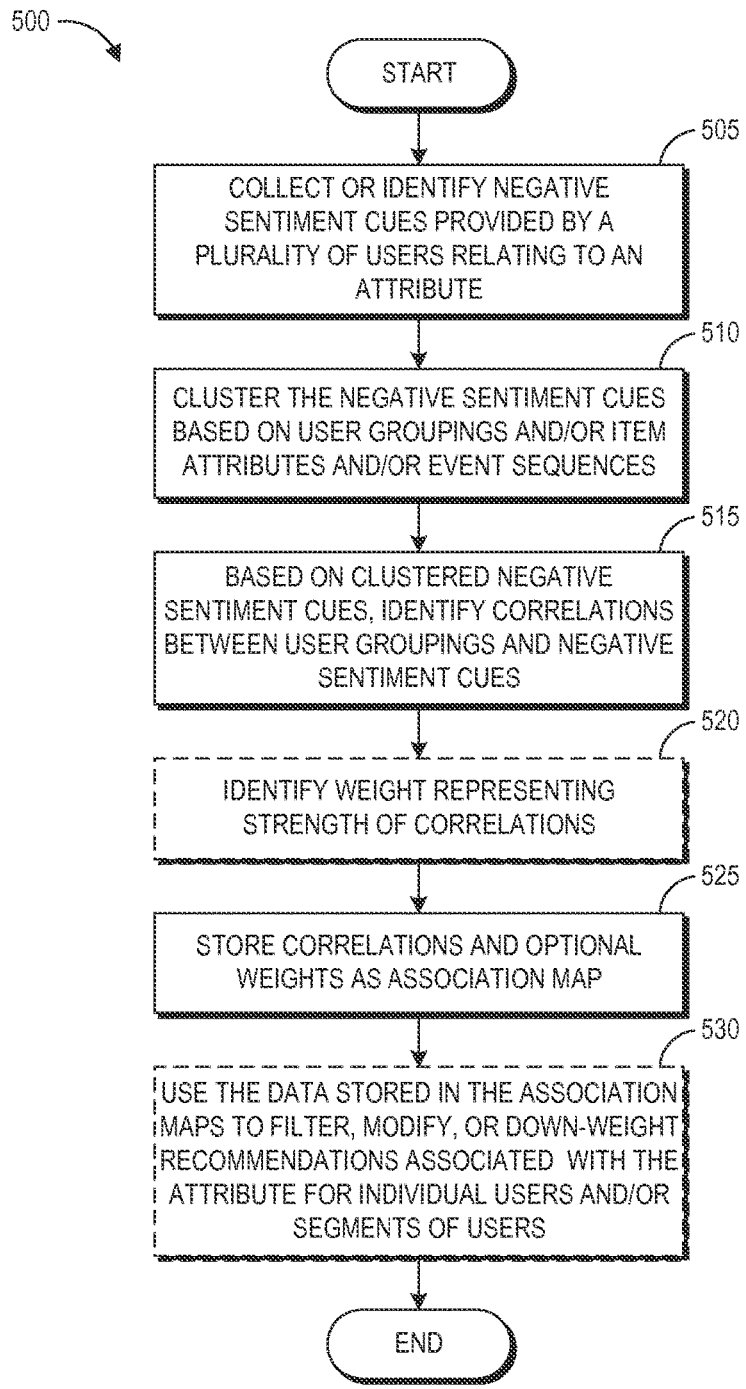

FIG. 3 is a flow diagram depicting an illustrative embodiment of an artificial intelligence process 500 that may be implemented by an interactive system, such as the system of FIG. 1, to identify items or attributes associated with negative user sentiment based at least partly on event analysis. For purposes of illustration, the process 500 is discussed as being implemented by the event analyzing service 260, though in other embodiments the process 400 can be implemented by any module, service, or system equipped to perform the event analysis embodiment of user sentiment analysis.

At block 505, the event analyzing service 260 can collect or identify negative sentiment cues provided by a plurality of users relating to an attribute (or item). Negative sentiment cues can include, in some embodiments, text mining in user complaints, calls to customer service, email opt outs, explicit "do not recommend" feedback, item ratings and/or textual reviews, lower engagement with recommendations (e.g., engagement outside of expected bounds), and sentiment expressed on social media sites. In some embodiments, negative sentiment cues can be analyzed through a chain of events or negative sentiment cues can be traced back to a trigger event, for example using Markov chain analysis. The event analyzing service 260 can identify the longest chain of events common to a particular cluster or segment of users.

At block 510, the event analyzing service 260 can cluster the negative sentiment cues based on user groupings, item attributes, and/or event sequences (for example, negative sentiment cues commonly being provided at the end of an identified chain of events or after a key event in the chain of events). This can be done via a variety of techniques including LDA, K-means, K-Nearest neighbor, Bayesian statistics, classifiers, and the like. In some embodiments, if a user completes a particular number of events or a key event in an identified chain of events leading to an identified negative sentiment cue, then the user may be grouped into a segment with other users also completing the number of events of key event in the chain.

At block 515, the event analyzing service 260 can, based on clustered negative sentiment cues, identify correlations between user groupings and negative sentiment cues. Correlations can be determined based on an increased likelihood that users in the groupings express the negative sentiment cues in comparison to a more general population of users.

Optionally, at block 520, the event analyzing service 260 can identify a weight representing the strength of correlations, that is, a level of user negative sentiment. The weight can be based, for example, on one or more of a type of negative sentiment cue (e.g., implicit or explicit), a number of completed events in a chain identified for a segment associated with a user, aggregation of negative sentiment across a number of segments associated with the user, and the like.

At block 525, the event analyzing service 260 can store correlations and optional weights as association map or computer model for filtering recommendations. For example, the association map can store data representing user segments and/or user segment attributes that are correlated with the attribute about which the negative sentiment cues were provided. Some embodiments of the association map may further include weights representing the strength of the correlation with the negative sentiment. In some embodiments, the keyword identification embodiment can receive the attribute and extract offensive keywords and/or items to further populate the association map. Some embodiments of the process 500 may terminate after block 525.

In some embodiments, the process 500 may continue to block 530 at which the recommendation service 295 can use the data stored in the association maps to filter, modify, or down-weight recommendations associated with the attribute for individual users and/or segments of users. In such embodiments, blocks 505 through 525 of the process may be performed periodically or "offline" by the event analyzing service 260 while block 530 is performed in real time by the recommendation service 295.

Terminology

The foregoing embodiments have been presented by way of illustration, and not limitation. Thus, nothing in the foregoing description is intended to imply that any particular feature, characteristic or step is essential to the invention. For example, although portions of this disclosure refer to a web site that provides online shopping functionality, the invention is not limited either to web site based implementations or to shopping systems.

The various components shown in FIG. 1, and the various processes described above (including those shown in FIGS. 2 and 3) may be implemented in a computing system via an appropriate combination of computerized machinery (hardware) and executable program code. For example, the catalog service 230, keyword mining service 280, event analyzing service 260, and other personalization services may each be implemented by one or more physical computing devices (e.g., servers) programmed with specific executable service code. Each such computing device typically includes one or more processors capable of executing instructions, and a memory capable of storing instructions and data. The executable code may be stored on any appropriate type or types of non-transitory computer storage or storage devices, such as magnetic disk drives and solid-state memory arrays. Some of the services and functions may alternatively be implemented in application-specific circuitry (e.g., ASICs or FPGAs). The various databases and data repositories 240, 250, 270 shown in FIG. 1 may be implemented using relational databases, flat file systems, tables, and/or other types of storage systems that use non-transitory storage devices (disk drives, solid state memories, etc.) to store data. Each such data repository may include multiple distinct databases.

Catalog service 230, keyword mining service 280, event analyzing service 260, portions thereof, and combinations thereof may be implemented by one or more servers 220. In other embodiments, any of the catalog service 230, keyword mining service 280, and event analyzing service 260, may be implemented by one or more server machines distinct from the servers 220. In yet other embodiments, the interactive computing system 210, the servers 220, the catalog service 230, keyword mining service 280, and/or the event analyzing service 260 may be implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a cloud computing environment.

Further, the processing of the various components of the illustrated systems can be distributed across multiple machines, networks, and other computing resources. In addition, two or more components of a system can be combined into fewer components. For example, the various systems illustrated as part of the interactive computing system 210 can be distributed across multiple computing systems, or combined into a single computing system. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments of the disclosure can be described in view of the following clauses:

1. An artificial intelligence method for building models of negative user sentiment, the artificial intelligence method comprising:
    identifying at least one item in an electronic catalog that, when recommended to one or more users, elicits negative sentiment cues from the one or more users;
    determining a plurality of attributes associated with the at least one item;
    generating a computer model for predicting whether recommendations of particular items will produce negative user sentiment, wherein generating the computer model comprises analyzing the plurality of attributes to identify one or more distinguishing attributes, the one or more distinguishing attributes having above a threshold level of uniqueness with respect to the at least one item when compared with attributes associated with a plurality of items in the electronic catalog; and
    using the computer model to exclude or inhibit recommendations of other items having the one or more distinguishing attributes;
    said method performed programmatically by a computing system that comprises one or more computing devices.

2. The artificial intelligence method of clause 1, wherein identifying the item is performed on one or more of a user-specific basis, user segment basis, or global user population basis.

3. The artificial intelligence method of clause 1 or clause 2, wherein the computer model comprises a keyword list generated based at least partly on the one or more distinguishing attributes.

4. The artificial intelligence method of any of clauses 1-3, further comprising training the computer model to predict one or both of other attributes that would elicit negative sentiment cues from the users and other users that would associate negative sentiment with the one or more distinguishing attributes.

5. The artificial intelligence method of clause 4, further comprising training the computer model through one or more of standard machine learning, supervised learning, or personalized Markov chains enabling the computer model to identify a series of actions which lead to negative sentiment cues.

6. The artificial intelligence method of any of clauses 1-5, wherein analyzing the plurality of attributes to identify one or more distinguishing attributes comprises identifying a frequently reviewed attribute of a single item.

7. The artificial intelligence method of any of clauses 1-6, wherein analyzing the plurality of attributes to identify one or more distinguishing attributes comprises one of (1) identifying that a set of reviews have the one or more distinguishing attributes in common, a review of the set of reviews associated with a different item than another review of the set of reviews, or (2) identifying that a set of items have the one or more distinguishing attributes in common.

8. A system for identifying offensive recommendation keywords, the system comprising:
    a behavioral event data repository configured to store at least data representing interactions of a plurality of users with an electronic catalog;
    a keyword mining service configured to at least generate a computer model for predicting whether recommendations of particular items will produce negative user sentiment, wherein to generate the computer model the keyword mining service is configured to at least:
        identify, based on the data representing the interactions, negative sentiment cues provided by the plurality of users with respect to one or both of an item and an attribute associated with the item,
        determine a plurality of keywords associated with one or both of the recommended item and the attribute, and
        determine, based at least partly on the negative sentiment cues, a keyword of the plurality of keywords that is offensive to the plurality of users; and
    a recommendation data repository configured to store the computer model comprising the keyword in association with one or more of the item, the attribute, and the plurality of users.

9. The system of clause 8, further comprising an item data repository configured to store data representing a plurality of items of the electronic catalog in association with at least one keyword associated with an item of the plurality of items.

10. The system of clause 9, wherein the keyword mining service is configured to receive the plurality of keywords from the item data repository.

11. The system of any of clauses 8-10, further comprising a recommendations service configured to use the computer model for down weighting or filtering future recommendations relating to one or both of the item and the attribute.

12. The system of clause 11, wherein the recommendations service is configured to identify other items associated with the attribute and use the computer model for down weighting or filtering future recommendations relating to the other items associated with the attribute.

13. A method for identifying offensive recommendation keywords, the method comprising:
    identifying a negative sentiment cue provided by at least one user with respect to an attribute;
    accessing a plurality of keywords associated with the attribute;
    generating a computer model for predicting whether recommendations of particular items will produce negative user sentiment, wherein generating the computer model comprises determining, based at least partly on analyzing the negative sentiment cue, a keyword of the plurality of keywords that is offensive to the at least one user; and storing the keyword in association with one or both of the attribute and the at least one user for use in modifying future recommendations relating to the attribute.

14. The method of clause 13, wherein the negative sentiment cue comprises one of accessing negative sentiment-related items, user-submitted comments on social media, user-submitted item reviews indicating offense, and user marking reviews of a recommendation as offensive.

15. The method of clause 13 or 14, wherein identifying a negative sentiment cue is performed for a particular user based at least partly on a subset of behavioral event data associated with the particular user.

16. The method of any of clauses 13-15, wherein identifying a negative sentiment cue is performed for a user segment based at least partly on a subset of behavioral event data associated with the user segment.

17. The method of clause 16, wherein determining the keyword of the plurality of keywords that is offensive comprises determining that users of the user segment are more likely than users in a general population to provide the negative sentiment cue in association with the attribute.

18. The method of any of clauses 13-17, further comprising receiving data representing interactions of the at least one user with one or both of an electronic catalog and external content sites.

19. The method of clause 18, wherein identifying the negative sentiment cue is based at least partly on analyzing the data representing the interactions.

20. The method of any of clauses 13-19, further comprising using the computer model to modify future recommendations relating to the attribute.

21. The method of any of clauses 13-20, further comprising additionally identifying positive sentiment cues provided by the at least one user with respect to the attribute.

22. The method of clause 21, further comprising updating the computer model based at least partly on the positive sentiment cues.

23. A computer-implemented method for identifying offensive recommendation keywords, the method comprising:

identifying at least one negative sentiment cue provided by at least one user with respect to an attribute or item;

determining, based at least partly on analyzing the at least one negative sentiment cue, a keyword associated with the attribute or item that is offensive to the at least one user; and storing the keyword for use in modifying future recommendations relating to the keyword.

24. An artificial intelligence system for identifying offensive recommendation attributes, the system comprising:

a behavioral event data repository configured to store at least data representing interactions of a plurality of users with an electronic catalog;

a computer system that implements an event analyzing service configured to:

receive the data representing the interactions from the behavioral event data repository, identify, based on an automated analysis of the data representing the interactions, negative sentiment cues provided by the plurality of users with respect to an attribute, cluster the negative sentiment cues at least partly by grouping the plurality of users into one or more user segments, identify, based at least partly on the clustering, a correlation between a negative sentiment cue of the negative sentiment cues and a user segment of the one or more user segments;

a data repository that stores the attribute in association with the user segment; and a recommendation system configured to use the association between the attribute and the user segment to inhibit or exclude recommendations associated with the attribute from being presented to members of the user segment.

25. The artificial intelligence system of clause 24, wherein the event analyzing service is further configured to cluster the negative sentiment cues at least partly by using Markov chains.

26. The artificial intelligence system of clauses 24 or 25, wherein the event analyzing service is configured to retrieve data representing a plurality of items of the electronic catalog and analyze the data to associate at least one of the plurality of items with the attribute.

27. The artificial intelligence system of any of clauses 24-26, wherein the negative sentiment cues include one or more of text mining in complaints submitted by the plurality of users, calls to customer service by the plurality of users, email opt outs requested the plurality of users, explicit "do not recommend" feedback provided by the plurality of users for items associated with the attribute, item ratings and/or textual reviews submitted by the plurality of users, lower engagement with recommendations by the plurality of users, or sentiment expressed on social media sites by the plurality of users.

28. The artificial intelligence system of any of clauses 24-27, wherein the correlation represents a higher likelihood that the user segment will express the negative sentiment cue relating to the attribute than will a user population more general than the user segment.

29. A method for identifying offensive recommendations, the method comprising:

collecting or identifying a plurality of negative sentiment cues provided by a plurality of users with respect to an attribute;

clustering the plurality of negative sentiment cues based at least partly on grouping the plurality of users into one or more user segments;

identifying, based at least partly on the clustering, a correlation between a negative sentiment cue of the negative sentiment cues and a user segment of the one or more user segments; and storing the attribute in association with the user segment as a computer model for providing recommendations;

said method performed programmatically by one or more computing devices.

30. The method of clause 29, wherein the plurality of negative sentiment cues include, by at least some of the plurality of users, one or more of text mining in complaints submitted, calls to customer service, email opt outs requested, explicit "do not recommend" feedback for items associated with the attribute, item ratings and/or textual reviews submitted, lower engagement with recommendations, comments submitted on social media sites, news articles, access of negative sentiment-related items, item reviews indicating offense, or marking of a recommendation as offensive.

31. The method of clauses 29 or 30, wherein grouping the plurality of users into one or more user segments comprises identifying a chain of events leading to a negative sentiment cue of the plurality of negative sentiment cues.

32. The method of clause 31, further comprising defining a particular user segment based at least partly on the chain of events.

33. The method of clause 32, wherein a user is grouped with the particular segment if a subset of behavioral data associated with the user includes a threshold number of events in the chain of events.

34. The method of any of clauses 29-33, further comprising using the computer model to modify future recommendations relating to the attribute based at least partly on the keyword.

35. The method of clause 34, wherein using the computer model to modify future recommendations comprises one of filtering future recommendations relating to the attribute to prevent presentation to the user segment and down weighting future recommendations relating to the attribute for presentation to the user segment.

36. The method of any of clauses 29-35, wherein clustering the plurality of negative sentiment cues is based at least partly on using Markov chains to cluster the negative sentiment cues.

37. The method of any of clauses 29-36, further comprising identifying a plurality of items in an electronic catalog that are associated with the attribute.

38. Non-transitory computer-readable medium storing instructions which, when executed, cause one or more computing devices to perform operations for identifying offensive recommendation attributes, the operations comprising:
   receiving behavioral data representing interactions of a user with one or both of an electronic catalog and a plurality of external content sites;
   identifying, based at least partly on analyzing the behavioral data, a negative sentiment cue provided by the user;
   tracing back the negative sentiment cue through a chain of events associated with the user;
   identifying, based at least partly on the tracing back, a correlation between the negative sentiment cue and an attribute; and
   storing the attribute in association with the user for down weighting or filtering future recommendations for presentation to the user, the future recommendations relating to the attribute.

39. The non-transitory computer-readable medium of clause 38, wherein the negative sentiment cue comprises one or more of accessing negative sentiment-related items, user-submitted comments on social media, user-submitted item reviews indicating offense, user interactions with customer service, or user marking reviews of a recommendation as offensive.

40. The non-transitory computer-readable medium of clauses 38 or 39, wherein tracing back the negative sentiment cue comprises using Markov chains to identify at least one event in the chain of events occurring prior to the expression of the negative sentiment cue by the user.

41. The non-transitory computer-readable medium of clause 40, wherein the at least one event is associated with the attribute.

42. The non-transitory computer-readable medium of any of clauses 38-41, the operations further comprising identifying an event date associated with the user.

43. The non-transitory computer-readable medium of clause 42, wherein the attribute is associated with the event date, and wherein the negative sentiment cue represents a change in user sentiment regarding one or both of the attribute and the event date.

44. The non-transitory computer-readable medium of any of clauses 38-43, the operations further comprising generating a computer model for providing recommendations, the computer model configured to predict whether recommendations relating to the attribute will produce negative user sentiment for other users.

45. The non-transitory computer-readable medium of clause 44, wherein the computer model is further configured to identify similar users to the user, the operations further comprising using the computer model to exclude or inhibit recommendations relating to the attribute for presentation to the similar users.

46. The non-transitory computer-readable medium of clause 45, wherein behavioral data associated with the similar users includes a threshold number of events or an identified key event in the chain of events.

Depending on the embodiment, certain acts, events, or functions of any of the algorithms, methods, or processes described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a" and "an" are to be construed to mean "one or more" or "at least one" unless specified otherwise.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. Thus, nothing in the foregoing description is intended to imply that any particular feature, characteristic, step, operation, module, or block is necessary or indispensable. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. An artificial intelligence method for building models of negative user sentiment, the artificial intelligence method comprising:
    identifying, from data in a behavioral event data repository representing interactions of one or more users with at least one catalog item in an electronic catalog, that the at least one catalog item, when recommended to the one or more users, elicits negative sentiment cues from the one or more users indicating user offense to the at least one item;
    determining a plurality of attributes of the at least one item;
    generating a machine learning computer model for predicting whether recommendations of particular catalog items will offend users, wherein generating the machine learning computer model comprises (1) identifying one or more distinguishing attributes of the plurality of attributes, the one or more distinguishing attributes having above a threshold level of uniqueness with respect to the at least one catalog item when compared with attributes of other catalog items in the electronic catalog, and (2) generating an association mapping that negatively associates the one or more distinguishing attributes with the one or more users; and
    subsequently, and in real time in response to an action by a user of said one or more users, generating catalog item recommendations for the user by a process that comprises:
        determining a set of recommended catalog items for the user;
        determining, based on the association mapping, that the user is negatively associated with the one or more distinguishing attributes;
        modifying the set of recommended catalog items by doing one or more of (1) filtering out, from the set of recommended catalog items, a catalog item having the one or more distinguishing attributes; or (2) lowering a ranking, within the set of recommended catalog items, of a catalog item having the one or more distinguishing attributes; and
    outputting a representation of the modified set of recommended catalog items for presentation to the user, wherein each recommended catalog item is associated with a network page describing the catalog item,
    said method performed programmatically by a computing system that comprises one or more computing devices.

2. The artificial intelligence method of claim 1, wherein the one or more users consists of said user.

3. The artificial intelligence method of claim 1, wherein the one or more distinguishing attributes includes characterizing keywords mined from catalog item descriptions.

4. The artificial intelligence method of claim 1, further comprising training the machine learning computer model to predict one or both of other attributes that would offend the users and other users that would be offended by the one or more distinguishing attributes.

5. The artificial intelligence method of claim 4, further comprising training the machine learning computer model through one or both of supervised learning or personalized Markov chains enabling the machine learning computer model to identify a series of actions which lead to negative sentiment cues.

6. The artificial intelligence method of claim 1, wherein the one or more catalog items consists of a single catalog item.

7. A computer process for using negative user sentiment to reduce offensive recommendations, the process comprising, by execution of program instructions by a computing system comprising one or more computing devices:
    detecting an event in which a user provides negative feedback on an auto-generated recommendation of a catalog item represented in an electronic catalog;
    generating a computer model capable of predicting whether recommendations of particular catalog items will offend the user, wherein generating the computer model comprises: (1) detecting distinguishing attributes of the catalog item by identifying attributes that distinguish the catalog item from other catalog items represented in the electronic catalog, and (2) generating an association mapping that negatively associates the user with the distinguishing attributes; and
    subsequently, and in real time in response to an action by the user, generating catalog item recommendations for the user by a process that comprises:
        determining a set of recommended catalog items for the user;
        modifying the set of recommended catalog items based on the association mapping by doing one or more of (1) filtering out, from the set of recommended catalog items, a catalog item having the distinguishing attributes; or (2) lowering a ranking, within the set of recommended catalog items, of a catalog item having the distinguishing attributes; and
        outputting a representation of the modified set of recommended catalog items for presentation to the user, wherein each recommended catalog item is associated with a network page describing the catalog item.

8. The computer process of claim 7, wherein the distinguishing attributes include keywords mined from catalog item titles.

9. The computer process of claim 7, wherein the distinguishing attributes include keywords mined from catalog item descriptions.

10. The computer process of claim 7, wherein generating the computer model further comprises generating weights for particular distinguishing attributes.

11. The computer process of claim 7, wherein modifying the set of recommended catalog items comprises filtering out, from the set of recommended catalog items, a catalog item having the distinguishing attributes.

12. The computer process of claim 7, wherein modifying the set of recommended catalog items comprises lowering a ranking, within the set of recommended catalog items, of a catalog item having the distinguishing attributes.

\* \* \* \* \*